United States Patent
Jacobs et al.

(10) Patent No.: US 6,502,003 B1
(45) Date of Patent: Dec. 31, 2002

(54) METHOD AND SYSTEM FOR CONTROLLING A CD-ROM DRIVE IN AN OPERATING SYSTEM-INDEPENDENT REDUCED POWER MODE

(75) Inventors: William E. Jacobs, Woodlands, TX (US); Dan V. Forlenza, Cypress, TX (US); James L. Mondshine, Cypress, TX (US); Gregory B. Memo, Spring, TX (US); Kevin R. Frost, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/569,859

(22) Filed: May 12, 2000

Related U.S. Application Data

(63) Continuation of application No. 08/879,876, filed on Jun. 20, 1997, now Pat. No. 6,073,187.

(51) Int. Cl.[7] .............................................. G06F 19/00
(52) U.S. Cl. ......................... 700/95; 700/90; 713/320; 710/14
(58) Field of Search .............................. 700/12, 90, 95; 710/10, 14, 18; 361/681, 682, 683; 713/320

(56) References Cited

U.S. PATENT DOCUMENTS

| | | | |
|---|---|---|---|
| 4,149,043 A | 4/1979 | Itoh et al. | 179/100 |
| 4,497,021 A | 1/1985 | Fukuda et al. | 364/200 |
| 4,852,073 A | 7/1989 | Shinohara et al. | 369/32 |
| 4,898,483 A | 2/1990 | Iizuka | 400/61 |
| 4,926,365 A | 5/1990 | Hsieh | 364/708.1 |

(List continued on next page.)

FOREIGN PATENT DOCUMENTS

| | | | | |
|---|---|---|---|---|
| EP | 0564092 A2 | 10/1993 | | G06F/1/16 |
| EP | 0588084 A2 | 3/1994 | | G06F/15/02 |
| JP | 09-101848 A | 4/1997 | | G06F/1/32 |

OTHER PUBLICATIONS

*Enhanced IDE 95/96 Guide*, Western Digital Corporation, Preliminary/Revision 0.95, Mar. 17, 1995, pp. 17 through 42.

*Advanced Power Management for DOS*, Victor R. Volkman, Windows/DOS Developer's Journal, p. 19–23 (Jul. 1992).

(List continued on next page.)

Primary Examiner—Thomas Black
Assistant Examiner—Ronald D Hartman, Jr.
(74) Attorney, Agent, or Firm—Akin Gump Strauss Hauer & Feld LLP

(57) ABSTRACT

A portage computer case whether in a closed state or open state permits a user to exercise control and monitor certain operating features. The user may toggle a control switch to place the computer system in a secondary operational mode, determine when a computer system is in a secondary operational mode, and adjust a digital master volume control during the secondary operational mode. The portable computer system includes a status indicator for indicating when a computer is in a secondary operational mode, digital master volume control buttons operable in a secondary operational mode, and a control switch for placing the computer system in a secondary operational mode. The status indicator, volume control buttons, and control switch are preferably provided on a top surface of the bottom shell of the portable computer for convenient access by a user. As such, a user is capable of placing the computer system in a secondary operational mode and determining when the computer system is in a secondary operational mode without opening the portable computer case. A user is also capable of adjusting volume control during a secondary operation mode without the need to access a plurality of volume controls, sort through software to adjust the volumes of the audio sources, or open the portable computer case to visualize volume controls for the audio sources on the main display screen.

18 Claims, 6 Drawing Sheets

U.S. PATENT DOCUMENTS

| | | | |
|---|---|---|---|
| 4,926,373 A | 5/1990 | Takenaka | 364/900 |
| 5,138,600 A | 8/1992 | Aoyagi | 369/58 |
| 5,200,913 A | 4/1993 | Hawkins et al. | 361/681 |
| 5,262,940 A | 11/1993 | Sussman | 364/403 |
| 5,377,358 A | 12/1994 | Nakamura | 395/500 |
| 5,404,546 A | 4/1995 | Stewart | 395/750 |
| 5,406,633 A | 4/1995 | Miller et al. | 381/320 |
| 5,471,576 A | 11/1995 | Yee | 345/302 |
| 5,477,129 A | 12/1995 | Myslinski | 320/48 |
| 5,481,645 A | 1/1996 | Bertino et al. | 704/270 |
| 5,579,524 A | 11/1996 | Kikinis | 395/750 |
| 5,592,640 A | 1/1997 | Minoura | 395/428 |
| 5,603,040 A | 2/1997 | Frager et al. | 395/750 |
| 5,617,571 A | 4/1997 | Tanaka | 395/750 |
| 5,630,144 A | 5/1997 | Woog et al. | 395/750 |
| 5,632,037 A | 5/1997 | Maher et al. | 395/750 |
| 5,657,445 A | 8/1997 | Pearce | 395/186 |
| 5,745,772 A | 4/1998 | Klein | 395/739 |
| 5,764,476 A | 6/1998 | Ohgami et al. | 361/683 |
| 5,768,164 A | 6/1998 | Hollon, Jr. | 364/710.14 |
| 5,796,984 A | 8/1998 | Pearce et al. | 395/500 |
| 5,815,679 A | 9/1998 | Liu | 395/309 |
| 5,824,022 A | 10/1998 | Zilberman et al. | 607/57 |
| 5,838,983 A | 11/1998 | Atkinson | 395/750.04 |
| 5,898,600 A | 4/1999 | Isashi | 364/705.01 |
| 6,006,285 A * | 12/1999 | Jacobs et al. | 710/14 |
| 6,073,187 A * | 6/2000 | Jacobs et al. | 710/14 |
| 6,252,511 B1 * | 6/2002 | Mondshine et al. | 340/636 |

OTHER PUBLICATIONS

*Battery–management circuitry gets smarter*, Victor R. Volkman, Computer Design's OEM Integration, p. 15–18 (May 1994).

*Intel486™ SL Microprocessor SuperSet Programmer's Reference Manual*, Intel Corp., Nov. 1992, pp. 6–29 through 6–53.

*Enhanced IDE 95/96 Guide*, Western Digital, Mar. 17, 1995, pp. 17 through 42.

*Pentium™ Processor User's Manual Volume 3: Architecture and Programming Manual*, Intel Corp., 1994, 20–1 through 20–9.

*The Computer Desktop Encyclopedia*, Alan Freedman, 1996, pp. 47, 226, 258, 479–480.

* cited by examiner

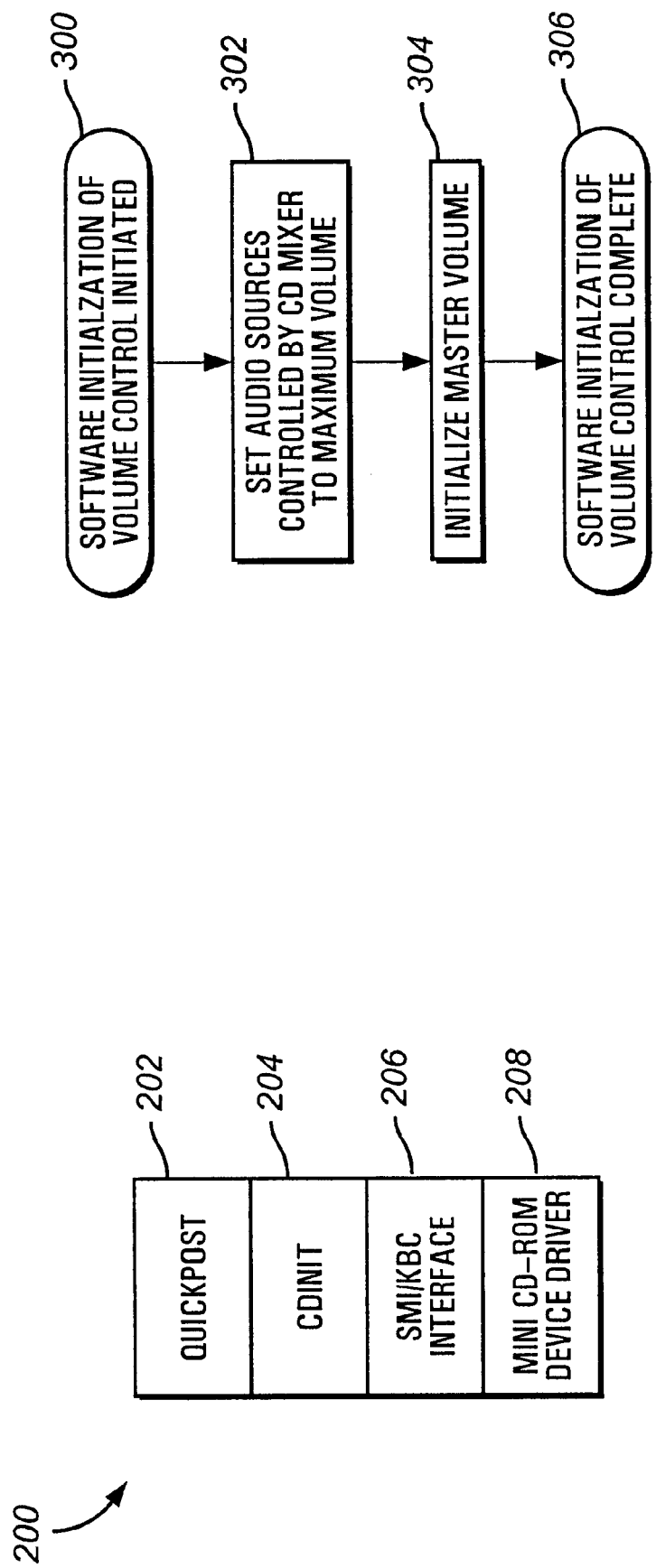

METHOD AND SYSTEM FOR CONTROLLING A CD-ROM DRIVE IN AN OPERATING SYSTEM-INDEPENDENT REDUCED POWER MODE

RELATED APPLICATIONS

This application is a continuation of Ser. No. 08/879,876, filed Jun. 20, 1997 now U.S. Pat. No. 6,073,187.

This application is related to the following co-pending, commonly owned United States Patent Application which is hereby incorporated by references.

U.S. patent application Ser. No. 08/846,641, filed on Apr. 30, 1997, entitled "COMPUTER SYSTEM CAPABLE OF PLAYING AUDIO CDS IN A CD-ROM DRIVE INDEPENDENT OF AN OPERATING SYSTEM," to William E. Jacobs, Dan V. Forlenza, James L. Mondshine, Tim L. Zhang, Greg B. Memo, Kevin R. Frost, and Lonnie J. Pope now U.S. Pat. No. 6,006,285.

BACKGROUND OF THE INVENTION

1. Field of the Invention

The present invention relates to controls and indicators, including master volume control buttons, a status indicator, and a control switch for a secondary operational mode of a computer system such as a mode for playing audio CDs in a CD-ROM drive independent of an operating system.

2. Description of the Related Art

Operating a CD-ROM drive in a computer system has required booting an operating system and loading and utilizing a CD-ROM drive application. The RAM-based CD-ROM device driver of the CD-ROM drive application allowed for operation of the CD-ROM drive. The lengthy duration of the booting process for an operating system and the considerable user interaction required by a CD-ROM drive application render playing an audio CD in the CD-ROM drive of a computer system, as opposed to in a conventional audio CD player, undesirable. An audio CD player, unlike a CD-ROM drive of a computer system, does not involve a timely initialization process and substantial user interaction. As such, despite the CD-ROM drive present in conventional computer systems, users have maintained a separate audio CD player in place of the portable computer. In addition, where a user is away from his or her audio CD player, a conventional computer system due to its initialization and user interaction requirements is unsuited to playing an audio CD as quickly and easily as allowed by a conventional audio CD player. Because of the initialization process and user interaction required, portable computer users would often carry a separate audio CD player for music listening even though the portable computer had music playing capability. Also, since a CD-ROM drive application was dependent upon an operating system, it was necessary to use a display screen to visually indicate to the user when a CD-ROM drive application was being operated. As such, portable computer users have been required to maintain the portable computer case containing a portable computer in its open state to determine the status of a CD-ROM drive application.

Further, a conventional computer system has required a user to access numerous locations, software and hardware, to adjust the volume and other settings of various audio sources such as a CD, wave, and synthesizer for music listening. These locations typically include a mixer in a Windows CD-ROM drive application for controlling the volume of audio sources, a software master volume control in a Windows task bar, and a hardware volume thumbwheel. As these volume control sources controlled volume independent of each other, it was necessary for a user to sort through cumbersome CD-ROM drive software to adjust the volume of the appropriate audio sources. In light of the software nature of certain volume controls, it was also necessary to maintain the portable computer case in its open state with the display screen visible to a user to allow for certain volume adjustments during music listening.

SUMMARY OF THE INVENTION

With the present invention, a user is capable of accomplishing several control and monitoring functions whether a portable computer case is maintained in a closed state or open state. These functions include toggling a control switch to place the computer system in a secondary operational mode, determining when the computer system is in a secondary operational mode, and adjusting digital master volume control during the secondary operational mode. The portable computer system of the present invention includes a status indicator for indicating when a computer is in a secondary operational mode, digital master volume control buttons operable in a secondary operational mode, and a control switch for placing the computer system in a secondary operational mode. The status indicator, master volume control buttons, and control switch are preferably provided on the top surface of the bottom shell of the portable computer for convenient access by a user. Thus, a user is able to of placing the computer system in a secondary operational mode and determining when the computer system is in a secondary operational mode without opening the portable computer case. A user is able to adjust volume control during a secondary operation mode without the need for tedious, cumbersome tasks, such as to access a plurality of volume controls, sort through software to adjust the volumes of the audio sources, or open the portable computer case to visualize volume controls for the audio sources on the computer's main display screen.

BRIEF DESCRIPTION OF THE DRAWINGS

A better understanding of the present invention can be obtained when the following detailed description of the preferred embodiment is considered in conjunction with the following drawings, in which:

FIG. 2 is a diagram of the firmware code in the audio CD mode ROM of FIG. 1 for the keyboard controller embodiment of the present invention;

FIG. 3 is a flow chart of the software initialization process for configuring the computer system of FIG. 1 for its master volume control buttons;

DETAILED DESCRIPTION OF THE PREFERRED EMBODIMENT

Figure 1:
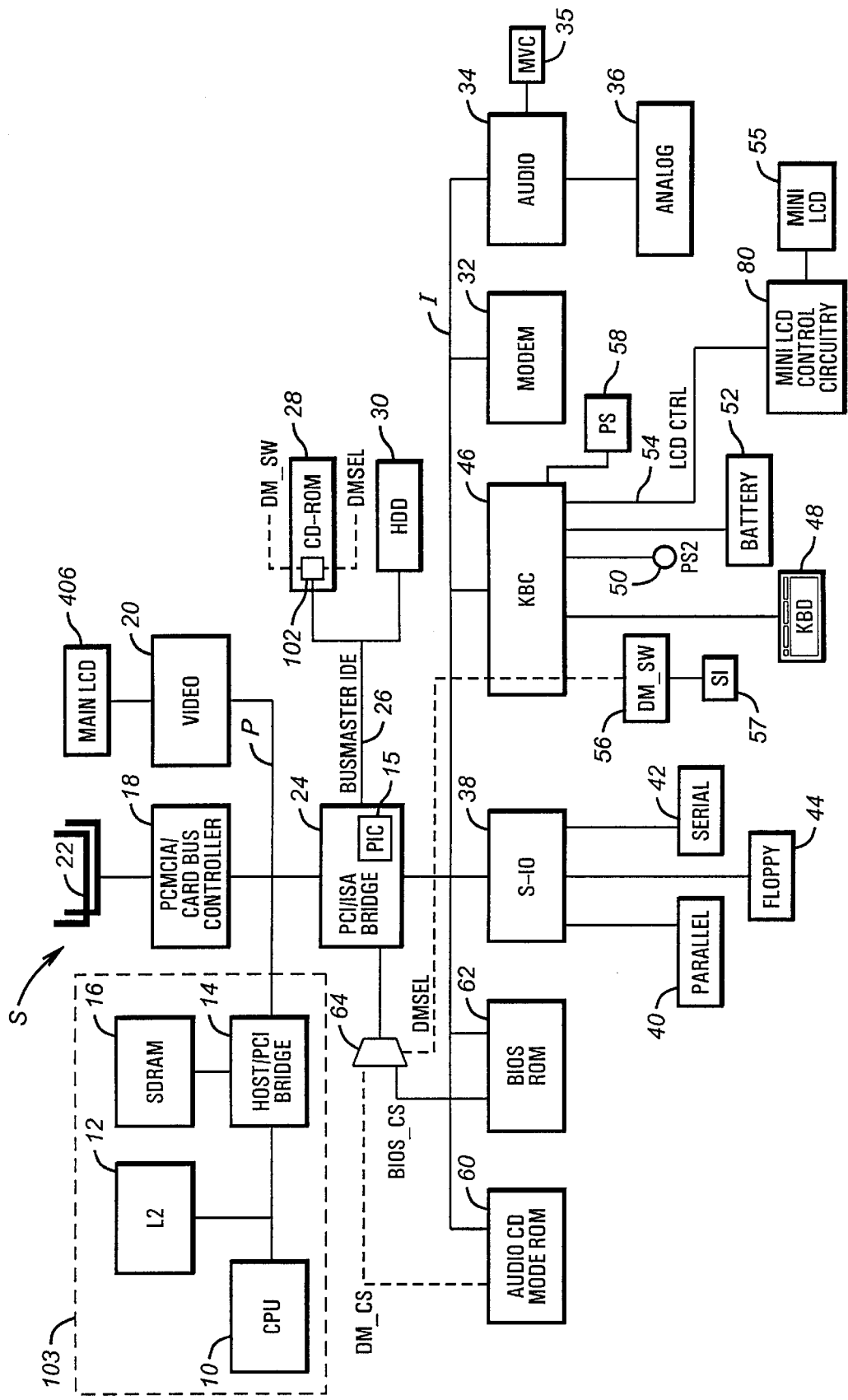
FIG. 1 is a schematic diagram of a portable computer system showing an audio CD mode ROM, audio CD mode switch, status indicator, and master volume control buttons of the present invention.

Turning to FIG. 1, a schematic diagram of a portable computer system S of the present invention is shown. Within the portable computer S, a CPU 10 and a Level 2 (L2) cache 12 are connected. The processor 10 is preferably a Pentium® processor manufactured by Intel Corporation of Santa Clara, Calif. The processor 10 operates preferably with a standard IBM-PC compatible operating system, such as Windows 95, available from MicroSoft Corporation of Redmond, Wash. The L2 cache 12 provides additional caching capabilities to the processor's on-chip cache to improve performance.

Figure 4:
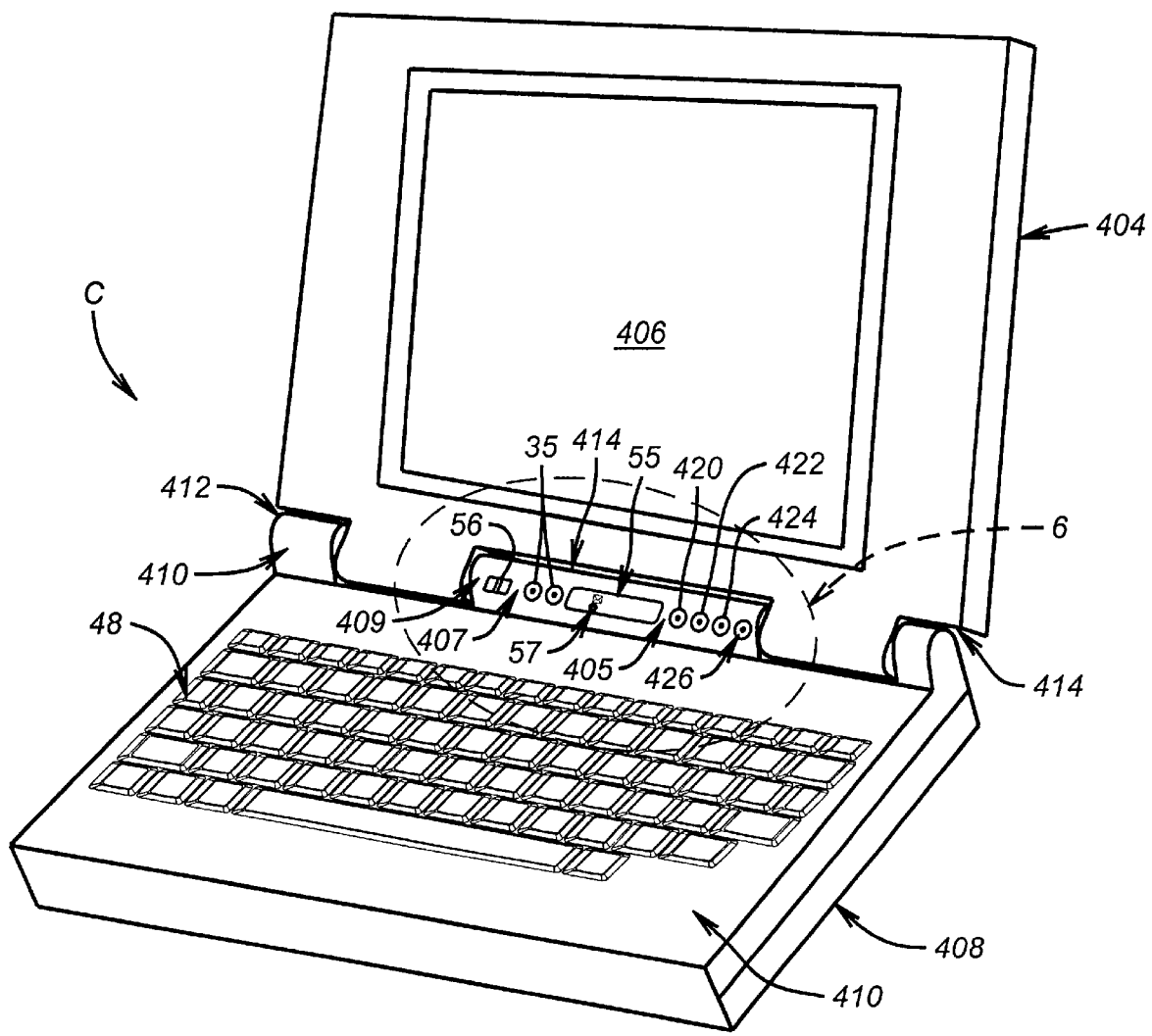
FIG. 4 is an isometric view of a portable computer case containing the computer system of FIG. 1 in an open state.

The CPU 10 and the L2 cache 12 are connected to a host/PCI bridge 14. Also connected to the host/PCI bridge 14 is a synchronous DRAM 16. The host/PCI bridge 14 is further coupled to a PCI bus P that connects to a PCMCIA/CardBus controller 18 and a video card 20 including a video graphics controller and video memory. The video graphics controller of card 20 provides control signals to the main liquid crystal display screen 406 (FIGS. 1 and 4). The PCMCIA/CardBus controller 18 is also coupled to a set of PCMCIA cards 22 (FIG. 1) for connecting a variety of peripherals to the portable computer S.

A PCI/ISA bridge 24 is used to connect the PCI bus P and an ISA bus I. Coupled to the PCI/ISA bridge 24 is an IDE interface 26 which connects to a CD-ROM drive 28 having an IDE controller and to a hard disk drive 30. The IDE interface 26 is preferably a busmaster and an IDE/ATA interface having enhanced IDE features. The CD-ROM drive 28 is preferably compliant with ATAPI (AT Attachment Packet Interface), the IDE standard for CD-ROM drives, and includes a CD-ROM drive controller 102 that is preferably embedded in the CD-ROM drive 28. Also, integrated in the PCI/ISA bridge 24 is a set of programmable interrupt controllers (PIC) 15 for managing hardware interrupts according to their priority. The controller set 15 preferably includes two cascaded PICs for allowing interrupt channels IRQØ–IRQ15.

Numerous chips which are preferably integrated into the PCI/ISA bridge 24 are coupled to the ISA bus I. Both a modem 32 and an audio or sound chip 34 are coupled to the ISA bus I. The sound chip 34 is further coupled to an acoustic output device 36 for outputting analog signals such as a set of speakers of the computer system S or an external stereo system. The speakers 36 are preferably audible externally while the portable computer case S is in a closed state. In addition, the sound board 34 is coupled to the digital master volume control buttons 35 of the present invention. Also, a S-IO chip 38 is coupled to the ISA bus I. The S-IO chip 38 provides a parallel port 40, a serial port 42 and connects to a floppy disk drive 44. To more clearly illustrate the features and operation of the present invention, certain other conventional computer devices and systems not directly involved in the present invention are not shown.

A keyboard controller 46 is also coupled to the ISA bus I. The keyboard controller 46 typically connects to a keyboard 48 (FIGS. 1 and 3), a PS/2 port 50, a battery 52, a port 54 coupled to the mini LCD control circuitry 810 of the present invention (FIG. 8) for providing control signals to a mini LCD screen 55 of the present invention and a power switch PWR_SW 58.

The keyboard controller 46 of the present invention includes system management interrupt (SMW) circuitry for generating system management interrupts. Certain processors, such as the Pentium® processor, have included a mode referred to as a system management mode (SMM) which is entered upon receipt of a system management interrupt. A SMI is the software interrupt with the highest priority and is operating system independent. Generation of a SMI also causes a SMI handler, which is typically located in a protected memory address space of the system DRAM 16, to be executed. A SMI handler is an interrupt service routine for performing specific system management tasks, like reducing power to specific devices or providing security services. SMI handler code thus may be written by one of ordinary skill in the art to perform a variety of system management tasks.

For the keyboard controller embodiment of the present invention, the keyboard controller 46 is further coupled to an audio CD mode switch DM_SW 56 (FIGS. 1 and 3) and the audio CD select signal DMSEL. For the CD-ROM drive controller embodiment of the present invention, the CD-ROM drive controller 102 is coupled to the audio CD mode switch DM_SW 56 and the audio CD select signal DMSEL. If the power switch DM_SW 58 of the computer system S is in an "on" state, the audio CD mode switch DM_SW 56 is disabled such that toggling of audio CD mode switch DM_SW 56 has no effect. The audio CD mode switch DM_SW 56 is also disabled when the computer system S in a sleep mode. If the power switch PWR_SW 58 of the computer system S is in an "off" state such as a hibernate mode, the audio CD mode switch DM_SW 56 is enabled.

When the audio CD mode switch DM_SW 56 is enabled, the state of the switch 56 determines whether the computer system S is in an audio CD mode. The audio CD mode switch DM_SW 56 when placed in an "on" state serves to place the computer system S of the present invention in an audio CD mode. Audio CD mode is a secondary operational mode which enables the computer system S of the present invention to bypass traditional system BIOS and play audio CDs in a CD-ROM drive 28 without running an operating system. For further details, reference is made to the co-pending application, entitled "COMPUTER SYSTEM CAPABLE OF PLAYING AUDIO CDS IN A CD-ROM DRIVE INDEPENDENT OF AN OPERATING SYSTEM" incorporated above. Also, a status indicator 57 of the present invention for indicating when the computer system S is in an audio CD mode is coupled to the audio CD mode switch DM_SW 56.

When the power switch 58 of a contemporary computer system is placed in an "on" state or the power switch PWR_SW 58 of the computer system S of the present invention is placed in an "on" state while the audio CD mode switch DM_SW 56 is in an "off" state such that the computer system S is in a PC or primary operational mode, the operating system of the computer proceeds to access and execute the system BIOS in the BIOS ROM. Executing system BIOS code results in a lengthy booting process wherein a power-on-self-test (POST) is performed on the system hardware in the computer system. In order to operate a CD-ROM drive in a conventional computer, an operating system must be loaded and a CD-ROM drive application initiated such that the device driver of the CD-ROM drive application serves as the interface between the CD-ROM drive and the operating system. The initiation of a CD-ROM application requires significant user interaction such as popping up windows and clicking on various portions of a computer screen.

Contrastingly, the computer system S of the present invention is capable of avoiding the lengthy boot process associated with contemporary BIOS ROM and the significant user interaction associated with a contemporary CD-ROM drive application by providing an audio CD mode. For the keyboard controller embodiment of the present invention, when the computer system S enters an audio CD mode, the processor-memory subsystem 103, the PCI/ISA bridge 24, the CD-ROM drive 28, the host/PCI bridge 14, the audio CD mode ROM 60, and the keyboard controller 46 are powered. ROM-based code including code for processing CD button selections is then loaded from an alternate ROM device, the audio CD mode ROM 60, instead of a conventional BIOS ROM device 62. An operating system is not loaded, thereby significantly reducing the duration of the system initialization.

Rather than using a ROM device for conventional BIOS code and a separate ROM device for the audio CD code of the present invention, the present invention may also be achieved by using a single ROM device. The single ROM device includes a memory address range for conventional BIOS code and a memory address range for audio CD code 200 of the present invention. If the audio CD select signal DMSEL is unasserted, a memory address range for conventional BIOS code is selected. If the audio CD select signal DMSEL is asserted, a memory address range for audio CD code 200 of the present invention is selected. Preferably, the conventional BIOS code and the audio CD code 200 share common code such as POST code. Also, the firmware in the audio CD mode ROM 60 region is preferably shadowed in the system DRAM 16 to accelerate BIOS accesses.

For the CD-ROM drive controller embodiment of the present invention, when the computer system S enters an audio CD mode, the CD-ROM drive 28 and the CD-ROM drive controller 102 are powered. While code is loaded from an alternate ROM region for the keyboard controller embodiment, the CD-ROM drive controller embodiment does not require embedded code in an alternate ROM region to process CD button selections. Rather, a CD-ROM drive controller 102 may directly provide CD button selections to a CD-ROM drive 28. Although use of a ROM region is described for both embodiments, the present invention extends to other non-volatile memory types.

Further, when the keyboard controller embodiment of the computer system S is placed in an audio CD mode, an audio CD select signal DMSEL is asserted and directed to a multiplexer OR gate 64. The multiplexer OR gate 64 receiving the audio CD select. signal DMSEL is coupled to or integrated into the PCI/ISA bridge 24. If the audio CD select signal DMSEL is unasserted, the multiplexer 64 selects the contemporary BIOS ROM 62 by asserting a BIOS control signal, BIOS_CS. If the audio CD select signal DMSEL is asserted, the multiplexer 64 selects the audio CD mode ROM 60 of the present invention by asserting an audio CD control signal, DM_CS.

Referring to FIG. 2, a diagram of the audio CD firmware code 200 in the audio CD mode ROM 60 is shown. The firmware 200 includes a mini-version of a power-on-self-test termed quick POST 202, a mini CD-ROM device driver 208, a SMI-keyboard controller interface 206, and CD NIT 204, the initialization code for the mini CD-ROM device driver 208. While a conventional CD-ROM device driver in CD-ROM applications is RAM-based, the mini CD-ROM device driver 208 in the audio CD mode ROM 60 is based on a non-volatile memory such as read-only-memory (ROM). Also, while the CD-ROM device driver in a conventional CD-ROM application must allow for playing of audio and data CDs, the mini CD-ROM device driver 208 in the audio CD mode ROM 60 allows for playing audio CDs, not data CDs, thereby requiring less code and reducing the execution time for the device driver code. If a non-audio CD is present in the CD-ROM drive 28, the audio CD code opens the door of the drive 28 and generates a beep to signal to the user that a non-audio CD is present in the drive 28.

In an audio CD mode, a CD button selection is fetched by a keyboard controller 46 in a keyboard controller embodiment of the present invention. A CD button selection generates an SMI thereby executing the SMI handler code. The SMI-keyboard controller interface firmware 206 is used to pass control from the keyboard controller 46 to the SMI handler. The SMI handler places a keycode which is preferably a bezel button variable corresponding to the selected CD button in a memory area termed a keycode cache. The keycode cache is preferably located in an extended BIOS data area segment of the SDRAM 16. The SMI handler is also used to generate a non-maskable interrupt (NMI) which calls the mini CD-ROM device driver 208.

In the present invention, a NMI indicates that a bezel button cache corresponding to a selected CD button is ready to be fetched by the mini CD-ROM device driver 208. The mini CD-ROM device driver 208, which is preferably a bezel button driver, fetches the bezel button variable from the keycode cache. The mini CD-ROM device driver 208 then transmits a CD packet command corresponding to the bezel button variable to the CD-ROM drive 28. The CD packet command is preferably a simplified version of the Small Computer System Interface (SCSI) command and is used with an ATAPI packet command protocol. The drive 28 then issues an interrupt request (IRQ) which informs the processor 10 that the drive 28 is ready for execution of the CD packet command. Lastly, the CPU 10 executes the CD packet command. The quick POST firmware 202 performs the necessary initialization for the audio CD mode of the computer system S. For instance, the quick POST firmware 202 may test for shadow ROM areas, initialize configuration registers, power on the CD-ROM drive 28, power off the hard disk drive 30, power down the PCMCIA CardBus controller 18, and initialize the audio chip 34.

A conventional computer system has required a user to access numerous locations, software and hardware, to adjust the volumes of various audio sources such as a CD, wave, and synthesizer for music listening. These locations typically include a mixer in a Windows CD-ROM drive application for controlling the volume of audio sources, a software master volume control in a Windows task bar, and a hardware volume thumbwheel. As these volume control sources controlled volume independent of each other, it was necessary for a user to sort through cumbersome CD-ROM drive software to adjust the volume of the appropriate audio sources. In light of the software nature of certain volume controls, it was also necessary to maintain the portable computer case in an open state with the display screen visible to a user to allow for certain volume adjustments during music listening.

The present invention eliminates these problems by providing master volume control buttons 35 allowing for a single source of volume control which is accessible while the portable computer case C is in a closed state. The master volume control buttons 35 are digital and are preferably connected directly to the audio chip 34. The volume up button and the volume down button of the master volume control buttons 35 are hardwired inputs to the audio chip 34.

Referring to FIG. 3, a flow chart of the software initialization process for configuring the computer system S for the master volume control buttons 35 of the present invention is shown. At step 300, the software initialization process is initiated by the quick POST firmware 202 when the computer system S is being placed in an audio CD mode. Next, control proceeds to step 302 wherein the audio sources controlled by the CD mixer are set to maximum volume. In this way, the full audio range is made available for use by the digital volume control buttons 35 when the computer system S is in an audio CD mode. Next, in step 306, the master volume control buttons 35 of the present invention are initialized. In the preferred embodiment, the initialization setting for the master volume control buttons 35 is typically about one half, or 50%, of the maximum volume level. From step 306, the software initialization process concludes at step 308. Thus, the software image for the audio CD mode is set by the quick POST firmware 202 during the system initialization for the audio CD mode of the present invention.

Referring to FIG. 4, an isometric view of the portable computer case C which contains the computer system S in an open state is shown. Since a conventional CD-ROM drive application was dependent upon an operating system, it was necessary to use a conventional display screen to visually indicate to a user when a CD-ROM drive application was being operated. As such, portable computer users have been required to maintain a portable computer case containing a portable computer in an open state to indicate the status of a conventional CD-ROM drive application to the user.

Figure 5:
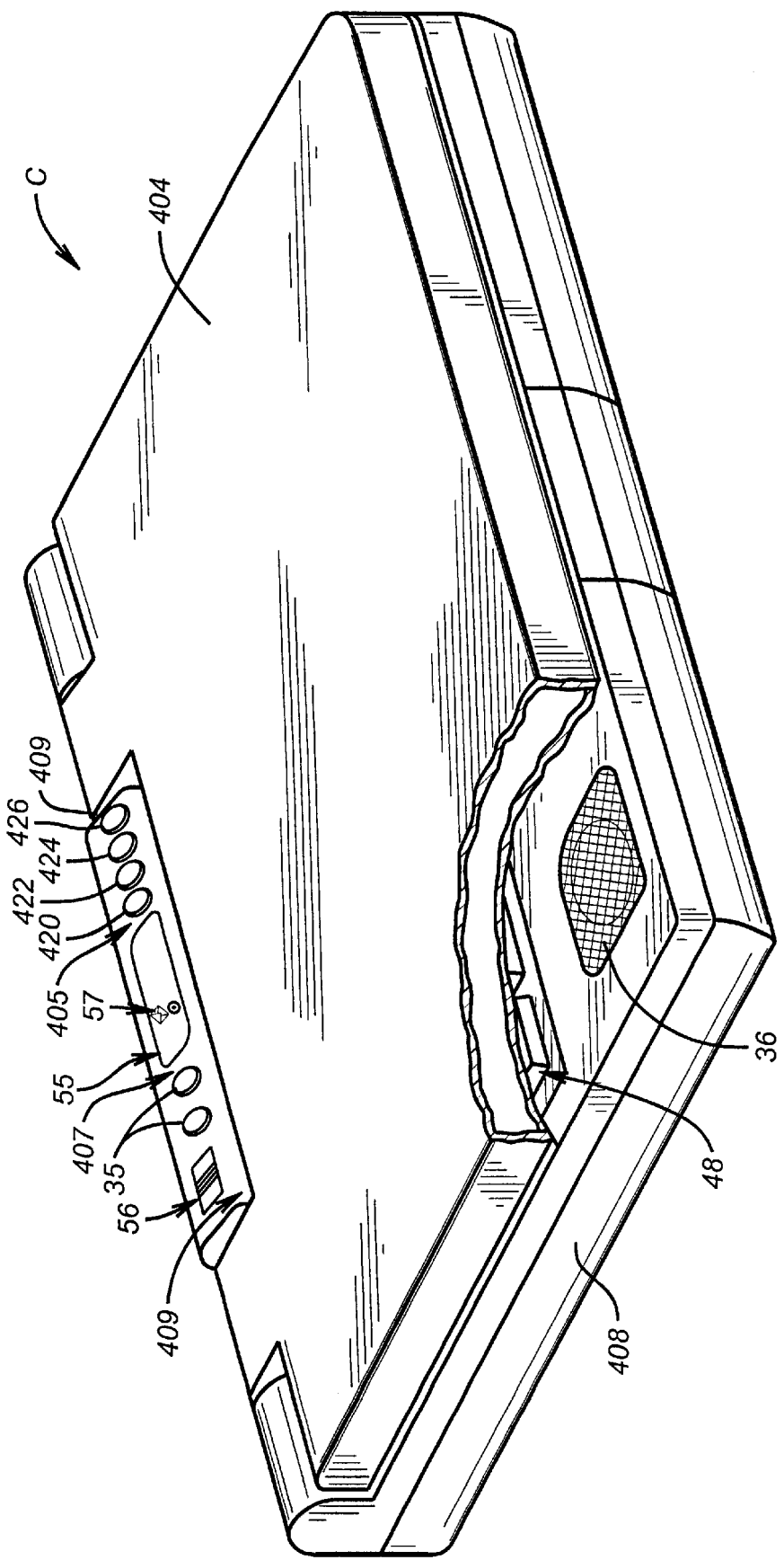
FIG. 5 is an isometric view of the portable computer case of FIG. 4 in a closed state.

In contrast, with the present invention, whether the portable computer case C is maintained in a closed state or open state, a user is capable of determining when a computer system S is in a secondary operational mode, such as a mode for playing audio CDs in a CD-ROM drive independent of an operating system. The portable computer case C includes a top shell 404 housing a main display screen 406 along with other components and a bottom shell 408 housing a keyboard 48 along with other components. The portable computer S of the present invention includes a status indicator 57 for indicating when the computer system S is in a secondary operational mode. The status indicator 57 (FIGS. 4–6) is provided on the top surface 410 of the bottom shell 408 of the portable computer case C. In the preferred embodiment, the status indicator 57 is provided near the rear side edge 412 of the bottom shell 408 at a location near the bottom or rear side edge 414 of the top shell 404. The location of the status indicator 57 and other control switches and indicators on bottom shell 408 is preferably at or near an area 409 where the bottom shell 408 and top shell 404 are pivotally connected to each other to open and close the case C. The edge 414 of top shell 404 is recessed or removed at a central portion 405 in the area 407 to permit viewing of the status indicator 57 whether the case C is open (FIG. 4) or closed (FIG. 5). Also, the status indicator 57 is preferably provided on an upwardly angled or ramp portion 400 of the top surface 410 so that the status indicator 57 may be easily seen by a user. It should be understood, however, that other locations on the bottom shell 408 which provide convenient viewing for a user may be used.

Figure 6:
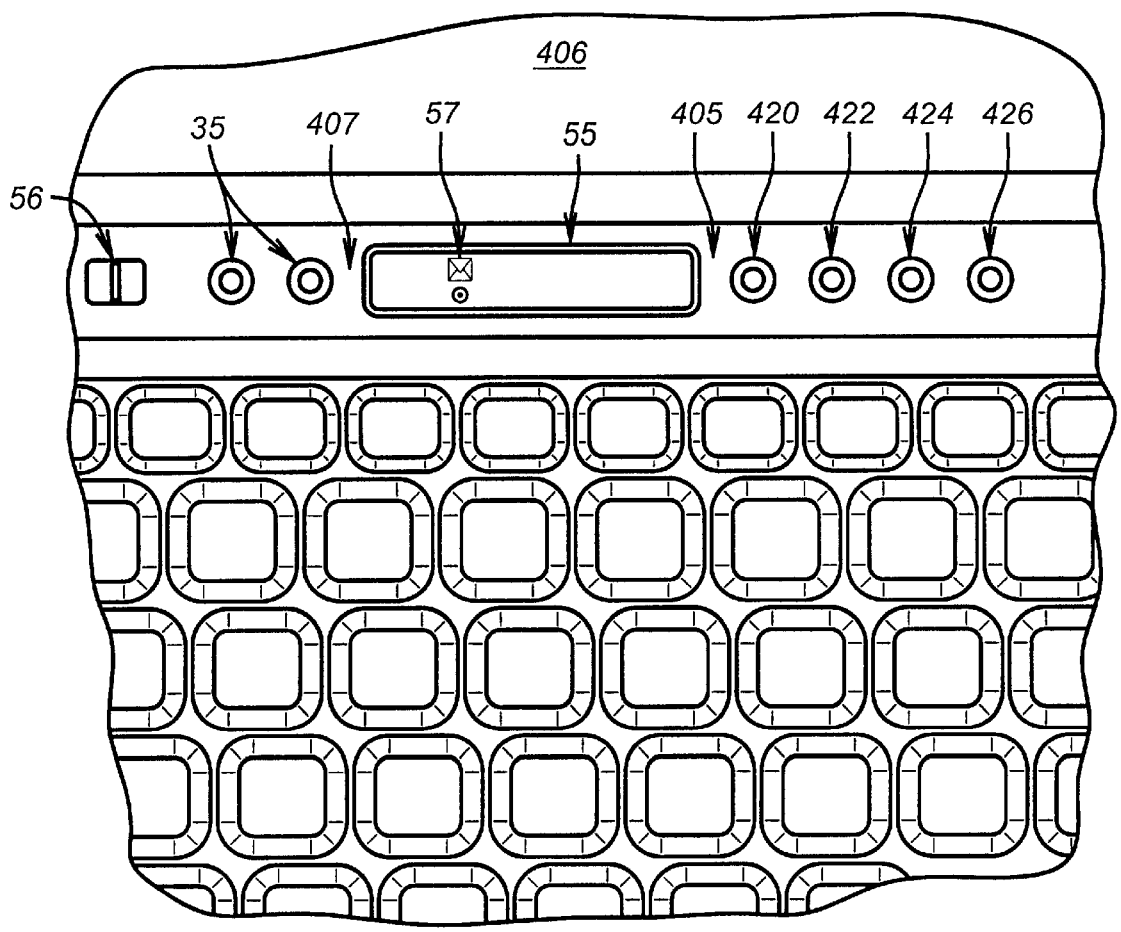
FIG. 6 is an enlarged plan view illustrating the portion of the top surface of the bottom shell of the portable computer case of FIG. 4 circled and having the numeral "6" designating same, showing in more detail the status indicator, master volume control buttons, and audio CD mode switch.

For a computer system S capable of playing audio CDs in a CD-ROM drive 28 independent of an operating system, the status indicator 57 is preferably a musical note above a circle having a dot in the center of the circle or other appropriate icon. The status indicator 57 is provided to the user on a mini status display screen 55 preferably of a liquid crystal composition. When the computer system S is in an audio CD mode, a pixel pattern corresponding to the icon is displayed on the status display screen 55. When the computer system S is in a primary operational mode, the icon is not displayed on the status display screen 55. Thus, an icon serves as a visual cue to the user. It should be understood that the status indicator 57 alternatively may include one icon for indicating a secondary operational mode and a different icon for indicating a primary operational mode. An enlarged view of a portion of the top surface 410 of bottom shell 408 of the portable computer case C is shown in FIG. 6. Thus, it can be seen that the status display screen 55 displaying the status indicator 57 is visible to the user whether the computer case C is open (FIG. 4) or closed (FIG. 5).

The master volume control buttons 35 (FIGS. 1, 4, 5, and 6) of the present invention also are preferably located on the top surface 410 of the bottom shell 408 of the portable computer case C at or near the locations described above for the status indicator 57. In this way, a user is capable of adjusting volume control with buttons 35 during a secondary operational mode. This can be done without the need to open the portable computer case C to visualize on the main display screen 406 the CD mixer volume controls for the audio sources. Along with the status indicator 57 and master volume control buttons 35 of the present invention, other CD control buttons such as play/pause 420, stop 422, previous track 424, and next track 426 are similarly located on the top surface 410 of the bottom shell 408 of the portable computer case C.

The status indicator 57 and master volume control buttons 35 due to their location (FIGS. 4, 5, and 6) are visible when the portable computer case C is closed (FIG. 5) as well as open (FIG. 4). The audio CD mode control switch DM_SW 56 is also provided on the top surface 410 of the bottom shell 408 such that the audio CD mode control switch DM_SW 56 is accessible to the user when the computer case C is in an open state or a closed state.

Figure 7:
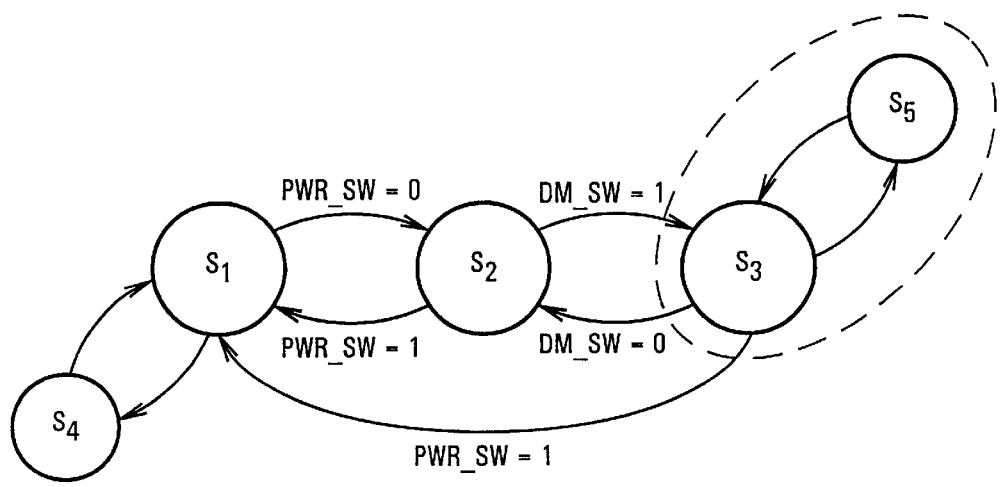
FIG. 7 is a state diagram of the power control states of the computer system of FIG. 1.

Referring to FIG. 7, a state diagram of the power control states of the portable computer system S is shown. The power control states are controlled by the keyboard controller 46 for the keyboard controller embodiment of the present invention. The $S_1$ state is the normal "on" power state of the computer system. The $S_1$ state corresponds to the power control switch PWR_SW 58 having a logical state of "1." In the $S_1$ state, the audio CD mode control switch DM_SW 56 for the secondary operational mode computer system is disabled such that toggling the switch DM_SW 56 has no effect. However, in the $S_2$ state, the audio CD mode control switch DM_SW 56 is enabled. When the power switch PWR_SW 58 is switched to a "0" logical state corresponding to an "off" power state, the system is placed in the $S_2$ power control state. An example of a power control mode corresponding to the $S_2$ power control state is a hibernate mode of the computer system S.

In the $S_2$ state, when the audio CD mode control switch DM_SW 56 is switched to a "1" logical state, the computer system S is placed in the $S_3$ power control state. The $S_3$ power control state corresponds to the normal power state for a secondary operational mode of a computer system S such as a mode for playing audio CDs in a CD-ROM drive independent of an operating system. In the $S_3$ power state, the processor 10 clock performs at full speed.

After power up of a secondary operation mode of the computer system S the audio CD code places the computer system S in the $S_5$ power state using logic in the PCI-ISA bridge 24. The audio CD code also places the computer system S in the $S_5$ power state after a CD button selection is processed. However, when a CD bezel button is being processed, the audio CD code places the computer system S in the $S_3$ power control state. The $S_5$ power state is a power-on-suspend (POS) mode in which the processor 10 clock is stopped.

While the computer system S is in an audio CD mode, the system S is in either the $S_3$ power state or the $S_5$ power state. From the $S_3$ state, toggling the audio CD mode control switch DM_SW 56 to a logical state of "0" returns the computer system to the $S_2$ state. Also, from the $S_3$ state, toggling the power control switch PWR_SW 58 to a logical state of "1" places the computer system S in the $S_1$ state. From the $S_1$ state, the computer system S may also be placed in an $S_4$ state such as the sleep mode of the computer system S. In the sleep mode of the computer system S, the audio CD mode control switch DM_SW 56 is disabled.

Figure 8:
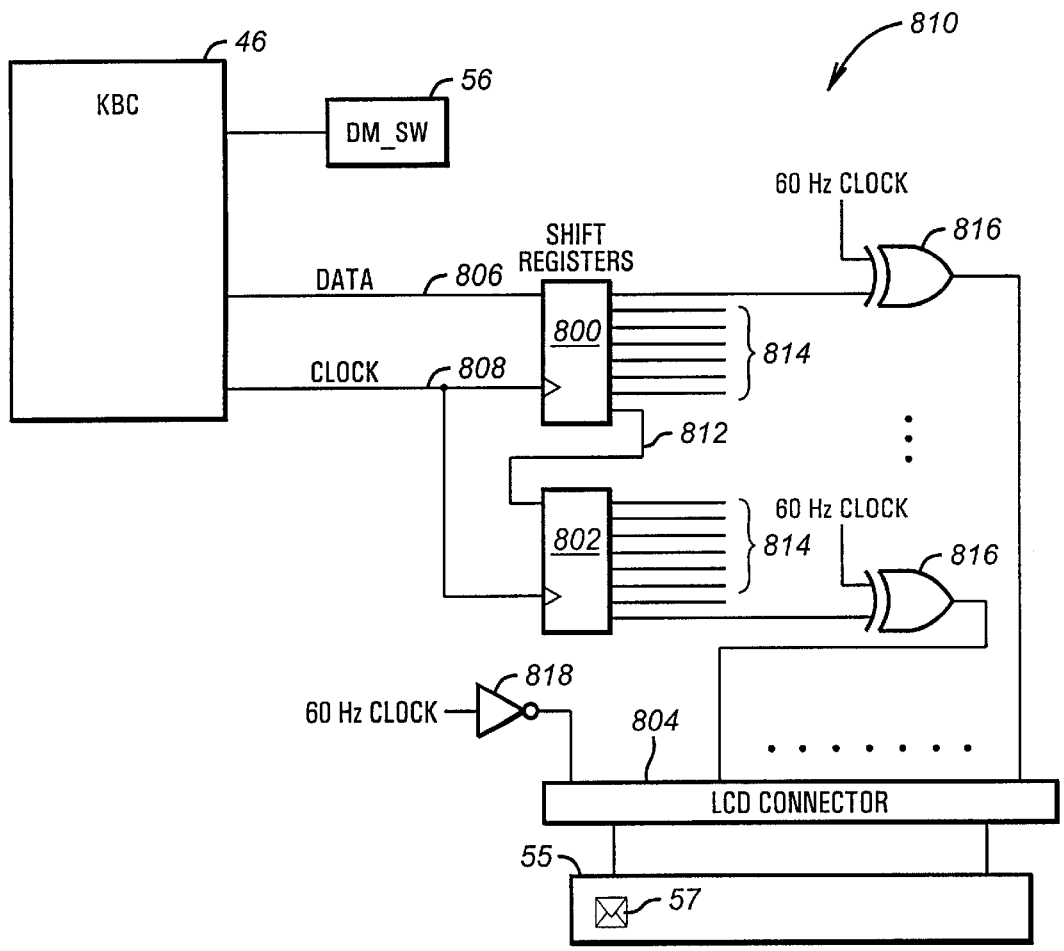
FIG. 8 is a schematic electrical circuit diagram of the mini status display screen control circuitry of the present invention.

Referring to FIG. 8, a schematic diagram of the mini status display screen control circuitry 810 of the present invention is shown. The control circuitry 810 is coupled between the keyboard controller 46 and the mini status display screen 55. The keyboard controller 46 is coupled to the audio CD mode switch DM_SW 56 so that the keyboard controller 46 may detect the status of the audio CD mode switch DM_SW 56. Based on the status of the audio CD mode switch DM_SW 56, the keyboard controller 46 provides a plurality of control signals to the mini status display screen 55.

In particular, the keyboard controller 46 generates a data signal 806 and a clock signal 808 that are communicated to the data inputs of two shift registers 800 and 802 which are preferably serial-in, parallel-out shift registers. With each cycle or tick of the clock signal 808, the shift registers 800 and 802 either load the data signal 806 or shift the current data in the register. One of the output state signals 812 of shift register 800 is provided as an input to shift register 802. The other output state signals 814 of the shift registers 800 and 802 are provided to the mini status display screen 55 through an LCD connector 804 to generate activation signals for segments of the mini status display screen 55. By using the keyboard controller 86 to generate a data signal 806 and a clock signal 808, only two pins from the keyboard controller 46 need to be dedicated to the operation of the mini status display screen 55. A plurality of the segments correspond to the portion of the mini status display screen 55 for displaying the secondary operational mode status indicator 57. Other segments may be used for displaying other status indicators such as a battery gauge indicator. Preferably, each of the output state lines 814 of the shift registers 800 and 802 to be provided to the mini status display screen 55 are intermittently illuminated. This may be done by leaving the status lines 814 modulated with a 60 Hz clock 816, preferably by using exclusive-OR gates to prevent damage to the mini status display screen 55. Also, an inverted clock signal 60 Hz clock 818 is used to modulate the outputs of the LCD connector 804.

Thus, a user is capable of viewing a status indicator 57 and accessing master volume control buttons 35 and a control switch 56 for a secondary operational mode when the portable computer case C is in either its open state or its closed state. A user, therefore, is not required to maintain the case in an open state to determine whether the computer system S is in a secondary operational mode, to place the computer system S in a secondary operational mode, or to adjust master volume control during a secondary operational mode of the computer system S.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A portable computer system adapted for controlling a CD-ROM drive in an operating system-independent reduced power mode, comprising:
   a CD-ROM drive to play an audio CD in the operating system-independent reduced power mode of the portable computer system;
   a status display screen to display operational status for the CD-ROM drive in the operating system-independent reduced power mode; and
   a plurality of CD control buttons to control the CD-ROM drive in the operating system-independent reduced power mode.

2. The portable computer system of claim 1, wherein the operating system-independent reduced power mode comprises an audio CD play mode for playing an audio CD in the CD-ROM drive.

3. The portable computer system of claim 1, wherein a processor clock of the portable computer system is stopped in the operating, system-independent reduced power mode.

4. The portable computer system of claim 1, further comprising:
   a CD-ROM drive controller coupled to the CD-ROM drive and the plurality of CD control buttons.

5. The portable computer system of claim 1, wherein the operating system-independent reduced power mode is a secondary operational mode of the portable computer system.

6. The portable computer system of claim 1, further comprising:
   a means for detecting a selection of the plurality of CD control buttons in the operating system-independent reduced power mode.

7. The portable computer system of claim 1, further comprising:
   a means for directing a selection of the plurality of CD control buttons to the CD-ROM drive in the operating system-independent reduced power mode.

8. The portable computer system of claim 1, wherein the status display screen displays an icon to indicate the portable computer system is in the operating system-independent reduced power mode.

9. A CD-ROM controller for an operating system-independent reduced power mode of a portable computer system, the controller comprising:
   a means for detecting a selection of a plurality of CD control buttons of the portable computer system in an operating system-independent reduced power mode of the portable computer system; and
   a means for directing the selection to the CD-ROM drive in the operating system-independent reduced power mode.

10. The CD-ROM controller of claim 9, further comprising:
    a means for signaling a status display screen of the portable computer system to display operational status for the CD-ROM drive in the operating system-independent reduced power mode.

11. The CD-ROM controller of claim 9, further comprising:
    a means for detecting a signal for the portable computer system to enter the operating system-independent reduced power mode; and a means for detecting a signal for the portable computer system to exit the operating system-independent reduced power mode.

12. The CD-ROM controller of claim 9, further comprising:

a means for enabling digital volume control of the CD-ROM drive in the operating system-independent reduced power mode.

13. The CD-ROM controller of claim 9, wherein the operating system-independent reduced power mode comprises an audio CD play mode for playing an audio CD in the CD-ROM drive.

14. A method of playing an audio CD in a CD-ROM drive of a portable computer system in an operating system-independent reduced power mode, the portable computer system including a plurality of CD control buttons, the method comprising the steps of:

detecting a selection of the plurality of audio CD buttons in the operating system-independent reduced power mode; and directing the selection to the CD-ROM drive in the operating system-independent reduced power mode.

15. The method of claim 14, further comprising the steps of:

detecting a signal for the portable computer system to enter the operating system-independent reduced power mode; and detecting a signal for the portable computer system to exit the operating system-independent reduced power mode.

16. The method of claim 14, further comprising the step of:

signaling a status display screen of the portable computer system to display an operational status for the CD-ROM drive in the operating system-independent reduced power mode.

17. The method of claim 14, further comprising the step of:

processing an audio CD by the CD-ROM drive in response to the CD-ROM drive receiving the selection in the operating system-independent reduced power mode.

18. The method of claim 14, further comprising the step of:

enabling digital volume control for the CD-ROM drive in the operating system-independent reduced power mode.

* * * * *